Aug. 29, 1939. T. W. ROLPH 2,170,912
LUMINAIRE
Filed July 28, 1936 3 Sheets-Sheet 1

INVENTOR.
THOMAS W. ROLPH.
BY
ATTORNEY.

Aug. 29, 1939.  T. W. ROLPH  2,170,912
LUMINAIRE
Filed July 28, 1936  3 Sheets-Sheet 2
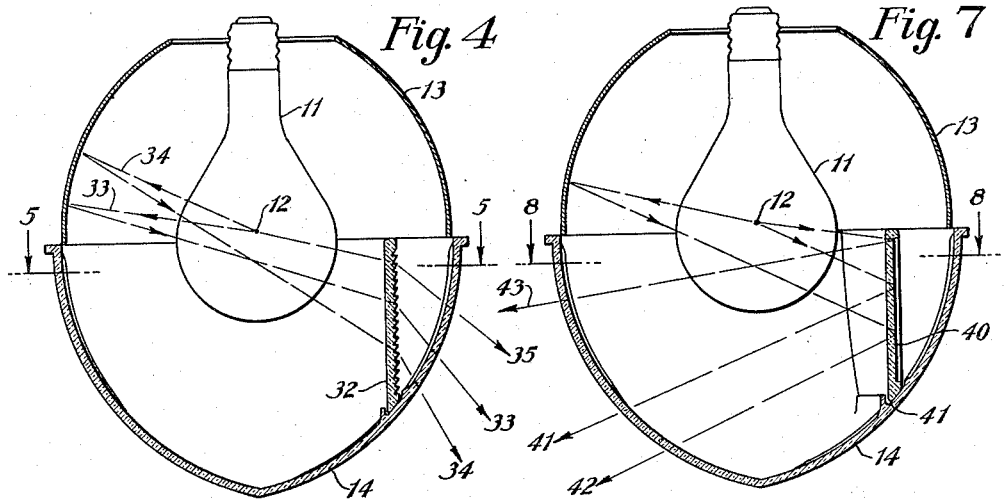
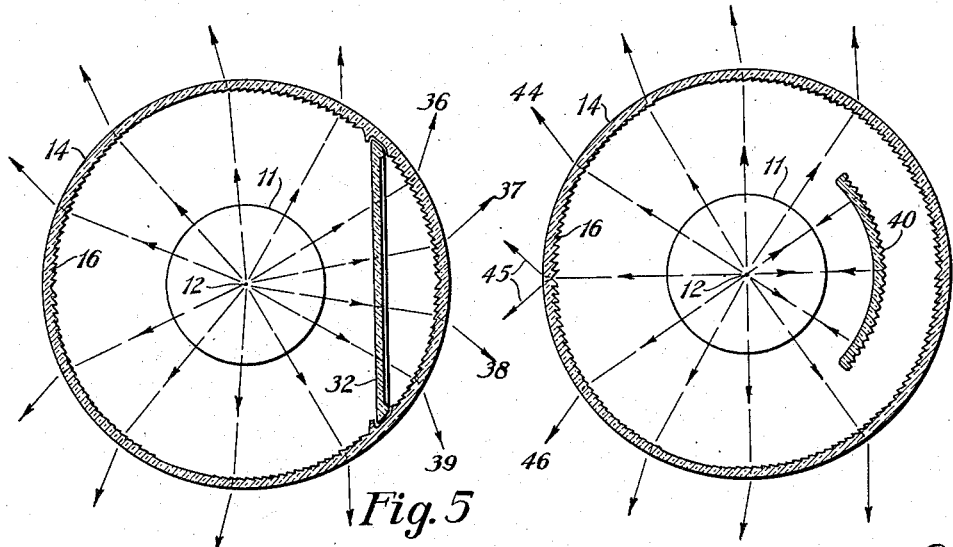
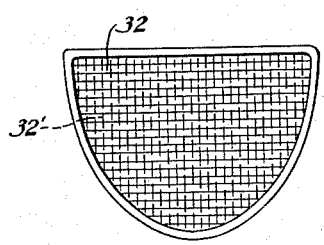
INVENTOR.
THOMAS W. ROLPH.
BY
ATTORNEY.

Aug. 29, 1939.    T. W. ROLPH    2,170,912
LUMINAIRE
Filed July 28, 1936    3 Sheets-Sheet 3

INVENTOR.
THOMAS W. ROLPH.
BY
ATTORNEY.

Patented Aug. 29, 1939

2,170,912

UNITED STATES PATENT OFFICE 2,170,912

LUMINAIRE

Thomas W. Rolph, Newark, Ohio, assignor to Holophane Company, Inc., New York, N. Y., a corporation of Delaware Application July 28, 1936, Serial No. 92,975

8 Claims. (Cl. 240—93)

The present invention relates to improvements in luminaires, more particularly those designed for street lighting, and having a prismatic open-topped bowl or band about the light source, for obtaining asymmetric distribution of the light in horizontal planes, and (usually) a reflecting dome-like cover for the bowl which directs reflected light down into the bowl for asymmetric redistribution thereby, in the same way as the direct light.

In this particular type of equipment, the lamp filament is placed slightly above the lower edge of the bowl and the redirection of light in vertical directions is attained by means of the reflector. In this position, with proper reflector design, a considerable degree of concentration of light is obtained at high angles. Thus, the vertical distribution is of a type satisfactory for street lighting requirements, in which light has to be delivered on the street at a great distance from the luminaire, to avoid dark areas between luminaires.

An asymmetric distribution of light is generally required in street lighting because the area to be lighted is much greater in length than in width. In the luminaires of the type above referred to, the asymmetric distribution is obtained by lateral redirection of light and this lateral redirection of light may be obtained by refracting prisms on the lower transmitting bowl or by refracting prisms in the reflector itself.

The present invention pertains to means of obtaining improved asymmetric lighting results, particularly when the reflector of this construction is symmetric and the refractor is asymmetric. It is often desirable to use symmetric reflectors because of their ease of manufacture and in that case all of the asymmetric effect or lateral redirection of light must be obtained by means of the lower refracting band or bowl. In such cases and particularly when the luminaire is mounted at the side of the street, it is impossible with ordinary constructions to obtain sufficient sideways redirection of light on the house side of the luminaire. Furthermore, whether the reflector be symmetric or asymmetric and whatever may be the asymmetric effect obtained by the bowl, there is some light transmitted on the house side in the direction of houses or lawns. The reflector comes down far enough over the lamp to shield it properly in directions up and down the street and across the street but a lower angle of shielding is generally desirable on the house side of the luminaire.

The present invention contemplates the provision of simple and inexpensive adjuncts to the construction of the types referred to for providing additional redirection of light and giving a better shielding effect throughout some horizontal angle generally on the house side of the luminaire, or on any side desired.

The additional light redirecting and shielding elements are interiorly disposed in the prismatic member and are arranged to divert the light, either by laterally refracting it, or by reflecting it in such a way as to avoid its emission in the region where brightness becomes objectionable.

These shielding elements may be made in the form of plates adapted to be inserted in the refractor or outer envelope. In addition, they allow a small amount of light to fall on the inside of the refracting bowl shielded against direct rays so that the bowl does not appear to have a dark spot.

Other and further objects of the present invention will appear as the description proceeds.

The accompanying drawings show, for purposes of illustrating the present invention, several embodiments in which the invention may take form, it being understood that the drawings are illustrative of the invention rather than limiting the same.

In these drawings:

Figs. 4 and 5 are similar vertical and horizontal sectional views of a modified form of construction for securing both lateral and vertical deviation of light in the zone of shielding, Fig. 5 being taken on the line 5—5 of Fig. 4;

Fig. 6 illustrates the refracting plate of Figs. 4 and 5;

Figs. 7 and 8 are similar vertical and horizontal sectional views through a modified form of construction for shielding a particular zone and reflecting the light which would ordinarily be emitted in the region being shielded, Fig. 8 being taken on the line 8—8 of Fig. 7;

Figure 1:
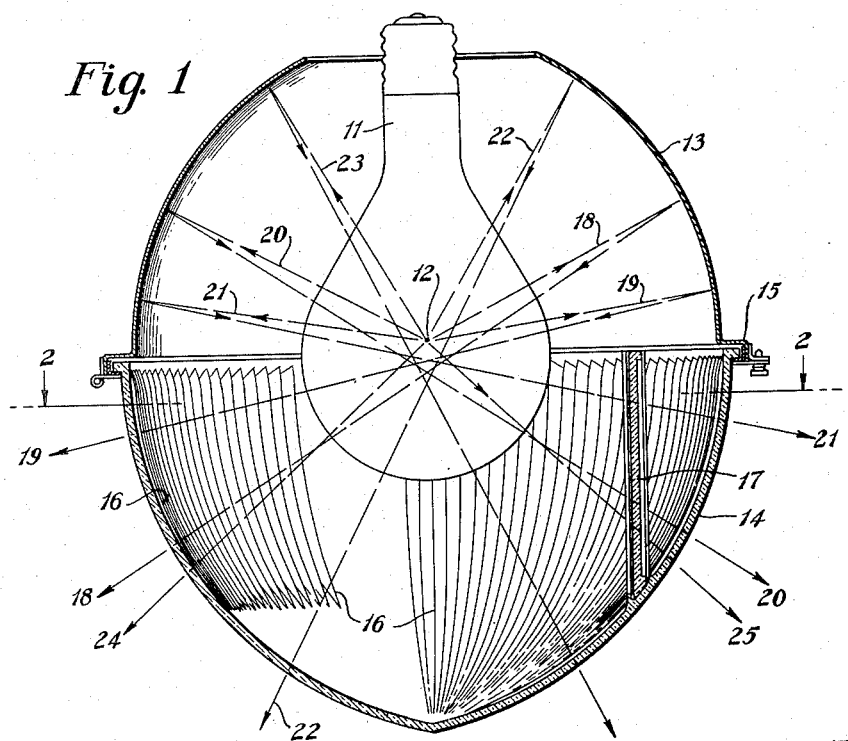
Fig. 1 is a vertical sectional view through one form of construction designed for lateral deviation only.

Figure 1 shows a lamp 11 with light center 12 and received in an annular reflector 13, the lower edge of which comes slightly below the light center of the lamp so that it shields the lamp from view at angles close to the horizontal. A lower refractor 14, preferably a bowl or band, is fitted to the lower edge of the reflector and supported in any suitable way, as for example, by the hinged band 15 illustrated in Fig. 1. The lower refracting bowl 14 carries radial refracting prisms 16 which redirect the light sideways and concentrate it into two beams for street illumination, but they cannot by themselves produce as much redirection of light as would be desirable in certain cases. An accessory piece 17 is fitted into the refractor bowl and provides additional redirection of light.

Figure 1 shows the way in which vertical redirection of light is obtained. For example, the light rays 18, 19, 20 and 21, which are in the region where the dominant light flux of the upper hemisphere of the light source is emitted, are spread out at wide angles by means of the lower portion of the reflector. Light rays such as 22 and 23 are delivered at lower angles from the upper portion of the reflector. In addition to these reflected light rays, direct light from the lamp also passes through the lower refractor without redirection in vertical directions, as indicated by typical light rays 24 and 25.

Figure 2:
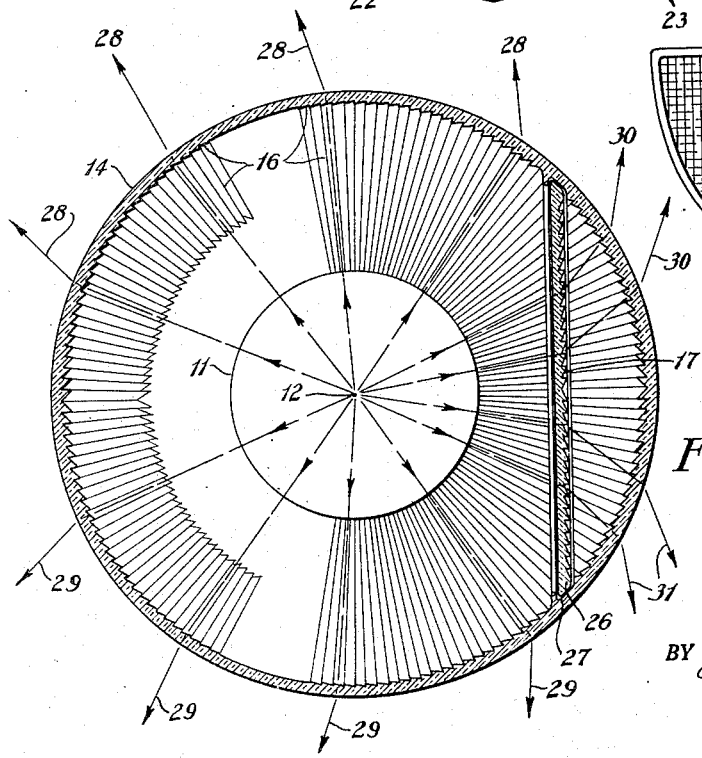
Fig. 2 is a horizontal sectional view on the line 2—2 of Fig. 1.

Figure 2 is a cross-section of the lower portion of Fig. 1 through the horizontal plane 2—2. In this figure also has been introduced the cross-section of the lamp showing the position of the light center. The lamp 11 is indicated with light center 12. The refracting bowl is 14, carrying lateral refracting prisms 16 and the accessory deflector 17. The deflector 17 has a suitable vertical or nearly vertical flange 26, and this fits into a slot 27 in the refracting bowl 14. The slot is so shaped that the refracting piece 17 may be slipped in from above and will remain snugly in place in service. This, however, is only one method of holding the deflector in place. It may be held in any other way. The bowl itself, 14, provides redirection of light as illustrated by typical light rays 28 and 29.

Figure 2 also shows the additional light redirection obtained by means of the accessory device 17. That portion of the bowl screened by the reflector 17 would not by itself redirect the light far enough laterally to be useful for some conditions of street lighting. The accessory device 17 carries vertical refracting prisms which provide a deviation such that the refraction produced by the outer refractor may direct the emitted light laterally. This is illustrated by typical light rays 30 and 31.

Figures 4, 5 and 6 show a construction designed to provide additional redirection of light in vertical directions rather than in lateral directions. In that case, the deflector 32 may carry horizontal refracting prisms to turn light downward. Figure 4 shows typical light rays 33 and 34, reflected from the reflector before striking the deflector 32 and light ray 35, indicative of the light passing through the deflector direct from the lamp. In Figure 5 typical light rays 36, 37, 38 and 39 show direct and reflected light passing through the deflector without any redirection in lateral directions. Comparison of Figures 2 and 5 will show the effect of the plate 17 of Figure 2 in securing lateral deviation.

In the construction of Figures 4–6, the light is turned away from the lawns and houses on the house side of the unit by redirection downward to a much greater extent than could be obtained by the upper reflector alone because this reflector cannot act on light which is emitted from the light source below its lower edge. To provide enough redirection by reflection of light striking the reflector would require an asymmetric type of reflector delivering the light at high angles from one side and at low angles from the other. This would be more expensive and less satisfactory mechanically than the symmetric reflector illustrated.

Figure 3:
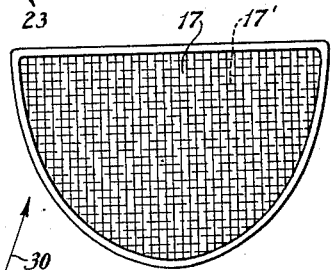
Fig. 3 is an elevational view of the deflector plate of Figs. 1 and 2.

For convenience of illustration, the plates 17 and 32 are shown as flat and vertical and having prisms in the emergent side. They may, however, be warped, tilted and have prisms on the light incident side or on both sides, or the plates may have both reflecting and refracting prisms, as shown in dotted lines 17' and 32' of Figures 3 and 6, which cross the other prisms.

It is also possible and sometimes desirable to use an accessory deflector for reflecting light by means of reflecting prisms. Figures 7 and 8 show such a deflector in a luminaire of this character. The accessory deflector is shown at 40. In order to reflect the light back through the axis of the luminaire, this deflector is curved in horizontal section as indicated in Figure 8, and the recess 41 curved accordingly. Light direct from the lamp and reflected from the reflector strikes the deflector 40 and is reflected back toward the opposite side of the refracting bowl. The lateral refracting prisms on this opposite side redirect the light laterally, the same as the direct light from the lamp or light reflected from the opposite side of the reflector. Typical light rays are illustrated in Figure 7 at 41, 42 and 43. Similar typical light rays are illustrated in Figure 8, as 44, 45 and 46.

In this reflecting construction, the prismatic type of reflector is desirable because this allows a certain small amount of transmitted light to reach the bowl back of the deflector. This transmitted light serves to illuminate the bowl dimly back of the deflector so that a disagreeable shadow is avoided. The lighted appearance of the complete luminaire is, therefore, satisfactory and the light redirection is accomplished as desired.

However, it may be desirable, for reasons of mechanical construction, efficiency or cost, to use some other type of reflecting deflector than the prismatic type shown at 40 in Figures 7 and 8. Any suitable reflecting material may be used, as, for example, polished metal or silvered glass. While the deflector generally should be specular in its reflecting characteristics, this is not necessary and opal glass, porcelain enamel or some plastic material may be used. In cases where the reflector is opaque, it is desirable to have it stand away from the glass of the refracting bowl a certain distance to permit some light to be diffused back of it, thus avoiding a sharp shadow on the bowl. While this is not necessary, it is usually desirable and may be accomplished by having the deflector fit tightly only throughout a part of its perimeter. The other part, as for example, the top edge, is not fitted tightly to the glass and allows direct or reflected light to pass back of the deflector and illuminate that portion of the bowl.

When the deflector is reflecting in its characteristics as in Figures 7 and 8, it is sometimes desirable to tip it slightly from the vertical with the top edge inward so as to turn the light downward as it is reflected from the deflector.

Figure 9:
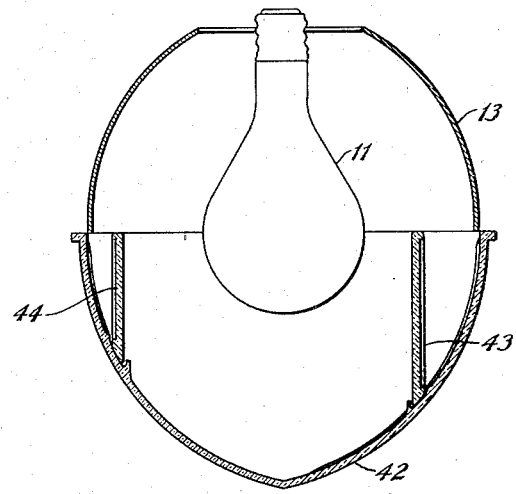
Fig. 9 illustrates a luminaire of the type shown in the preceding figures having light shields on two opposite sides of the light source.

Sometimes it is desirable to obtain supplementary redirection of light on more than one side of a luminaire of this character. For example, if the luminaire is mounted at one side of the street and supplementary redirection is desired on the house side, it may be found also that the light going directly across the street requires supplementary redirection to bring it onto the street. This would be the case with narrow streets where such light might go toward lawns and even houses on the opposite side of the street. In such cases, more than one deflector may be used if desired. Figure 9 illustrates such a construction. As in Figures 1 to 8, a lamp 11 is shown surrounded by a reflector 13 and carrying a lower refracting bowl 42. In this case, however, two deflectors 43 and 44 are illustrated. They could be identical in character as would be desirable for a refractor designed for mounting over the center of the street. For a luminaire mounted at the side of the street, however, the deflector on the house side would generally be larger than the one on the street side as is indicated in Figure 9.

Figure 10:
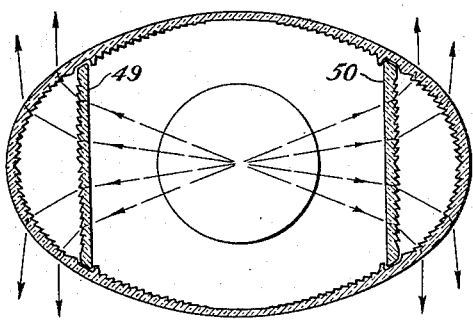
Fig. 10 is a horizontal sectional view similar to Fig. 2 showing a bowl of elliptical cross section with two light deflectors.

Another variation which may sometimes be desirable is the use of a bowl which is elliptical in horizontal cross-section. Such a bowl is illustrated in Figure 10 and it may employ two deflectors 49 and 50 as shown. The deflectors will fit well mechanically in such a shape of bowl and the shape lends itself to obtaining a good refracting effect in the directions desired. With such a construction it is often advantageous to have the reflector elliptical also.

Figure 11:
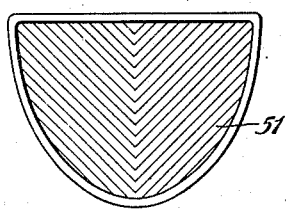
Figs. 11, 12 and 13 illustrate additional forms of shield for screening the desired area of the outer refractor.
Figure 12:
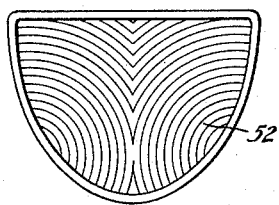
Figure 13:
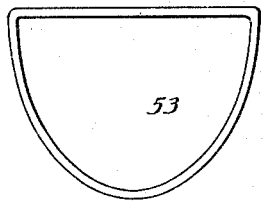

When using prisms on deflectors, it is not necessary to run them always horizontally or vertically. There may be advantages in certain cases in having refraction in diagonal directions in which case the prisms may be run diagonally across the deflector or in the form of a series of concentric arcs. Figure 11 shows a plate 51 having diagonal refracting prisms by means of which both vertical and lateral redirection can be obtained from the deflector. Figure 12 shows a pattern of refracting prisms 52 in the form of concentric arcs. These would give somewhat similar redirection of light to that obtained with the pattern shown in Figure 11, but would have certain advantages in certain cases. Figure 13 shows a plain construction which illustrates any type of plain reflector 53 such as polished metal, silvered glass, porcelain enamel, opal glass, plastic material, etc.

It will be obvious that deflectors of the character described may be curved or otherwise shaped in any way to fit the particular needs of various optical and mechanical requirements in units of this character. The deflectors may be made of any suitable material. They may be supported in any suitable manner. The shape of the upper reflector and the lower refracting bowl may be whatever is desired for obtaining the best light distribution in conjunction with the deflector. Usually it will be advantageous to have the upper reflector symmetrical but asymmetric effects from this upper reflector may be used as desired.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

I claim:

1. A luminaire comprising a light source, a reflector above the source, and a refractor closing the bottom opening of the reflector, the reflector being adapted to produce a redistribution of light in vertical planes and directing the dominant reflected light toward the refractor at high angles below the horizontal and the refractor being generally concave toward the light source and having vertical prisms which, without sensibly affecting the vertical distribution, produce a redistribution of both direct and reflected light in horizontal directions and provide an asymmetric distribution of light with regions of maximum and minimum intensity, the refractor being supplemented by an internal light deflector spaced substantially from the opposed refractor wall and extending in a generally vertical direction from the top of the refractor down across the path of the dominant reflected rays in a region in which the refractor normally produces a minimum intensity so as to intercept both direct and reflected light in this region and screen the opposed portion of the refractor surface to divert light which would otherwise fall on the area screened and augment the asymmetric distribution of light.

2. A luminaire comprising a light source, a reflector above the source, and a refractor closing the bottom opening of the reflector, the reflector being adapted to produce a redistribution of light in vertical planes and directing the dominant reflected light toward the refractor at high angles below the horizontal and the refractor being generally concave toward the light source and having vertical prisms which, without sensibly affecting the vertical distribution, produce a redistribution of both direct and reflected light in horizontal directions and provide an asymmetric distribution of light with regions of maximum and minimum intensity, the refractor being supplemented by an internal light deflector spaced substantially from the opposed refractor wall and extending in a generally vertical direction from the top of the refractor down across the path of the dominant reflected rays in a region in which the refractor normally produces a minimum intensity so as to intercept both direct and reflected light in this region and screen the opposed portion of the refractor surface, the deflector having prisms which divert light which would otherwise fall on the area screened and augment the asymmetric distribution of light.

3. A luminaire comprising a light source, a reflector above the source, and a refractor closing the bottom opening of the reflector, the reflector being adapted to produce a redistribution of light in vertical planes and directing the dominant reflected light toward the refractor at high angles below the horizontal and the refractor being generally concave toward the light source and having vertical prisms which, without sensibly affecting the vertical distribution, produce a redistribution of both direct and reflected light in horizontal directions and provide an asymmetric distribution of light with regions of maximum and minimum intensity, the refractor being supplemented by an internal light deflector spaced substantially from the opposed refractor wall and extending in a generally vertical direction from the top of the refractor down across the path of the dominant reflected rays in a region in which the refractor normally produces a minimum intensity so as to intercept both direct and reflected light in this region and screen the opposed portion of the refractor surface, the deflector having refracting prisms which divert light which would otherwise fall on the area screened and augment the asymmetric distribution of light.

4. A luminaire comprising a light source, a reflector above the source, and a refractor closing the bottom opening of the reflector, the reflector being adapted to produce a redistribution of light in vertical planes and directing the dominant reflected light toward the refractor at high angles below the horizontal and the refractor being generally concave toward the light source and having vertical prisms which, without sensibly affecting the vertical distribution, produce a redistribution of both direct and reflected light in horizontal directions and provide an asymmetric distribution of light with regions of maximum and minimum intensity, the refractor being supplemented by an internal light deflector spaced substantially from the opposed refractor wall and extending in a generally vertical direction from the top of the refractor down across the path of the dominant reflected rays in a region in which the refractor normally produces a minimum intensity so as to intercept both direct and reflected light in this region and screen the opposed portion of the refractor surface, the deflector having vertical refracting prisms which divert light which would otherwise fall on the area screened and augment the asymmetric distribution of light.

5. A luminaire comprising a light source, a reflector above the source, and a refractor closing the bottom opening of the reflector, the reflector being adapted to produce a redistribution of light in vertical planes and directing the dominant reflected light toward the refractor at high angles below the horizontal and the refractor being generally concave toward the light source and having vertical prisms which, without sensibly affecting the vertical distribution, produce a redistribution of both direct and reflected light in horizontal directions and provide an asymmetric distribution of light with regions of maximum and minimum intensity, the refractor being supplemented by an internal light deflector spaced substantially from the opposed refractor wall and extending in a generally vertical direction from the top of the refractor down across the path of the dominant reflected rays in a region in which the refractor normally produces a minimum intensity so as to intercept both direct and reflected light in this region and screen the opposed portion of the refractor surface, the deflector having reflecting prisms which divert light which would otherwise fall on the area screened and augment the asymmetric distribution of light.

6. A luminaire comprising a light source, a reflector above the source, and a refractor closing the bottom opening of the reflector, the reflector being adapted to produce a redistribution of light in vertical planes and directing the dominant reflected light toward the refractor at high angles below the horizontal and the refractor being generally concave toward the light source and having vertical prisms which, without sensibly affecting the vertical distribution, produce a redistribution of both direct and reflected light in horizontal directions and provide an asymmetric distribution of light with regions of maximum and minimum intensity, the refractor being supplemented by an internal light deflector spaced substantially from the opposed refractor wall and extending in a generally vertical direction from the top of the refractor down across the path of the dominant reflected rays in a region in which the refractor normally produces a minimum intensity so as to intercept both direct and reflected light in this region and screen the opposed portion of the refractor surface, the deflector having both refracting and reflecting prisms which divert light which would otherwise fall on the area screened and augment the asymmetric distribution of light.

7. A luminaire such as claimed in claim 2, wherein the light deflector is flat and secured to the refractor.

8. A luminaire such as claimed in claim 2, wherein the light deflector is cylindrical.

THOMAS W. ROLPH.